United States Patent [19]
Racioppi et al.

[11] Patent Number: 5,780,071
[45] Date of Patent: Jul. 14, 1998

| [54] | SYSTEM FOR CALIBRATOR CHANGEOVER |
|---|---|
| [75] | Inventors: Pat A. Racioppi, Sarver; Rocco D. Nocera, Harmony; Thomas C. Richards, Cranberry Township, all of Pa. |
| [73] | Assignee: Veka, Inc., Fombell, Pa. |
| [21] | Appl. No.: 626,482 |
| [22] | Filed: Apr. 2, 1996 |
| [51] | Int. Cl.⁶ .................................................... B29C 47/90 |
| [52] | U.S. Cl. ............... 425/186; 264/209.3; 264/280; 264/568; 264/571; 425/326.1; 425/384; 425/388; 425/392 |
| [58] | Field of Search ............... 425/71, 186, 192 R, 425/325, 326.1, 387.1, 384, 388, 392; 264/560, 562, 564, 566, 568, 571, 209.3, 209.4, 209.5, 280 |

[56] References Cited

U.S. PATENT DOCUMENTS

| 4,120,926 | 10/1978 | Titz ........................... 264/568 |
| 4,181,487 | 1/1980 | Kessler ....................... 425/388 |
| 4,401,424 | 8/1983 | De Zen ....................... 425/326.1 |
| 4,468,369 | 8/1984 | Gauchel et al. ............. 264/560 |
| 5,116,450 | 5/1992 | Spoo et al. .................. 156/441 |
| 5,139,402 | 8/1992 | Topf ............................ 425/326.1 |
| 5,288,218 | 2/1994 | Melkonian ................... 425/71 |
| 5,316,459 | 5/1994 | Melkonian et al. .......... 425/71 |
| 5,324,187 | 6/1994 | Cook ........................... 425/131.1 |
| 5,468,442 | 11/1995 | Brambilla ................... 264/571 |
| 5,510,071 | 4/1996 | Van Wonderen et al. .... 425/326.1 |
| 5,514,325 | 5/1996 | Purstinger ................... 425/388 |

*Primary Examiner*—Jay H. Woo
*Assistant Examiner*—Joseph Leyson
*Attorney, Agent, or Firm*—Cohen & Grigsby; Frederick L. Tolhurst

[57] ABSTRACT

Calibrators (10-16) are pre-aligned on a base (18) that is positioned on a table (60). A guide (82) includes a first section (84a, 84b) connected to base (18) and a second section (94) connected to table (60). First section (84a, 84b) cooperates with second section (94) to laterally maintain base (18) on table (60) while allowing thermal expansion of base (18) in the direction of a longitudinal axis (22).

10 Claims, 2 Drawing Sheets

5,780,071

1

SYSTEM FOR CALIBRATOR CHANGEOVER

BACKGROUND OF THE INVENTION

1. Field of the Invention

The subject invention is directed to systems for extruding thermoplastic shapes and, more specifically, systems and methods for the replacement of calibrators in plastic extrusion systems.

2. Description of the Prior Art

Various types of apparatus and methods for shaping materials according to selected profiles have been developed. These methods vary depending on the properties of the materials as well as other factors. Examples include aluminum extrusion and paltrusion of resin impregnated fibers as described in U.S. Pat. No. 5,116,450.

In the case of thermoplastic materials such as vinyl plastic, the material is shaped by being heated and extruded through a die. Basically, thermoplastic resins are fed into a heating element. The heated resin exits the heating element and is passed through a die of predetermined shape. The extruded length is drawn by a puller that maintains predetermined tension on the material length. The drawn length of material is then cooled and cut to a given length. As the material exits the die, it has sufficient plasticity that steps must be taken to maintain the extruded shape while heat is removed from the material until it attains sufficient rigidity.

Various mechanisms have been developed in the prior art to maintain this extruded shape. Frequently, calibrators such as described in U.S. Pat. Nos. 4,468,369 and 4,120,926 are used for this purpose. These devices selectively apply vacuum to the extrusion to control its shape. The interior walls of the calibrator provide additional sizing. At the same time, cooling water is circulated to internal passages in the calibrator to provide temperature control of the calibrators. Heat is thereby conducted away from the extruded material to increase its rigidity.

Frequently, a plurality of calibrators are used, due to limitations on deformation in the plastic material through any single calibrator. These are arrayed in linear fashion such that the extruded material serially passes through each calibrator and is progressively shaped and solidified as it passes through each calibrator.

It has been recognized in the prior art that each of the calibrators should be aligned with the longitudinal axis of the extruded material to reduce the strain on the material. Non-alignment of the calibrators tends to cause increased strain on that portion of the material that is in tension. This tended to slow the rate of manufacture and also adversely affected product quality. In some cases, this could result in broken or poorly shaped lengths. In the prior art, the narrow alignment tolerances in combination with the multiple connections required for vacuum and cooling water lines has required substantial set-up times when there is a changeover to a different extruded profile. During this set-up time, the extrusion line could not be productively used adding to the difficulty and cost of the manufacturing process.

The problems resulting from calibrator alignment requirements were recognized in the prior art as mentioned, for example, in U.S. Pat. Nos. 5,316,459 and 5,288,218. Attempts to address this problem generally involved incorporating all of the calibrator profiles in a single body as shown in U.S. Pat. No. 4,401,424. However, this required the redesign and manufacture of all existing calibrators.

Various schemes for pre-alignment of existing calibrators have been proposed from time-to-time. However, these have generally not been workable in practice because those pre-alignment techniques did not allow for differences in thermal expansion rates between the different components of the extrusion system. That is, the calibrators, which are typically made of aluminum, would vary in size in response to a given temperature change. The expansion rate of the calibrators was significantly higher than the rate of extrusion table and other system elements that were made of steel. This, in combination with the requirement for close alignment tolerances, created difficulty with certain pre-alignment techniques. For example, locator pins could not be used because the pins would register with the locator holes only within a narrow band of temperatures. If the tolerances in the pin-hole combinations were increased, the alignment tolerances for the calibrators would no longer be met.

Accordingly, there was a need in the prior art for a pre-alignment system and method that would meet tolerance limits for alignment of the calibrators and still be operable over a relatively wide band of temperatures.

SUMMARY OF THE INVENTION

In accordance with the subject invention, a plurality of calibrators are connected to a base. The extrusion system includes a support table. The calibrators each define a profile and are arranged in a linear array such that selected points on each profile define an axis. A guide includes first and second sections that cooperate in mating relationship and that also cooperate in sliding engagement in a direction that is substantially parallel to the axis of the calibrators. The first section of the guide is connected to the base and the second section of said guide is connected to a support table. Means for securing the base to the table is also included.

Preferably the guide opposes movement of the base with respect to the table in directions that are substantially orthogonal to the longitudinal axis.

More preferably, one section of said guide includes an extended portion and the other section of said guide includes a recessed portion.

Other objects and advantages of the invention disclosed herein will become apparent to those skilled in the art as a description of a preferred embodiment of invention proceeds.

BRIEF DESCRIPTION OF THE DRAWINGS

A presently preferred embodiment of the invention disclosed herein is shown and described in connection with the accompanying drawings wherein.

PREFERRED EMBODIMENT OF THE INVENTION

Figure 1:
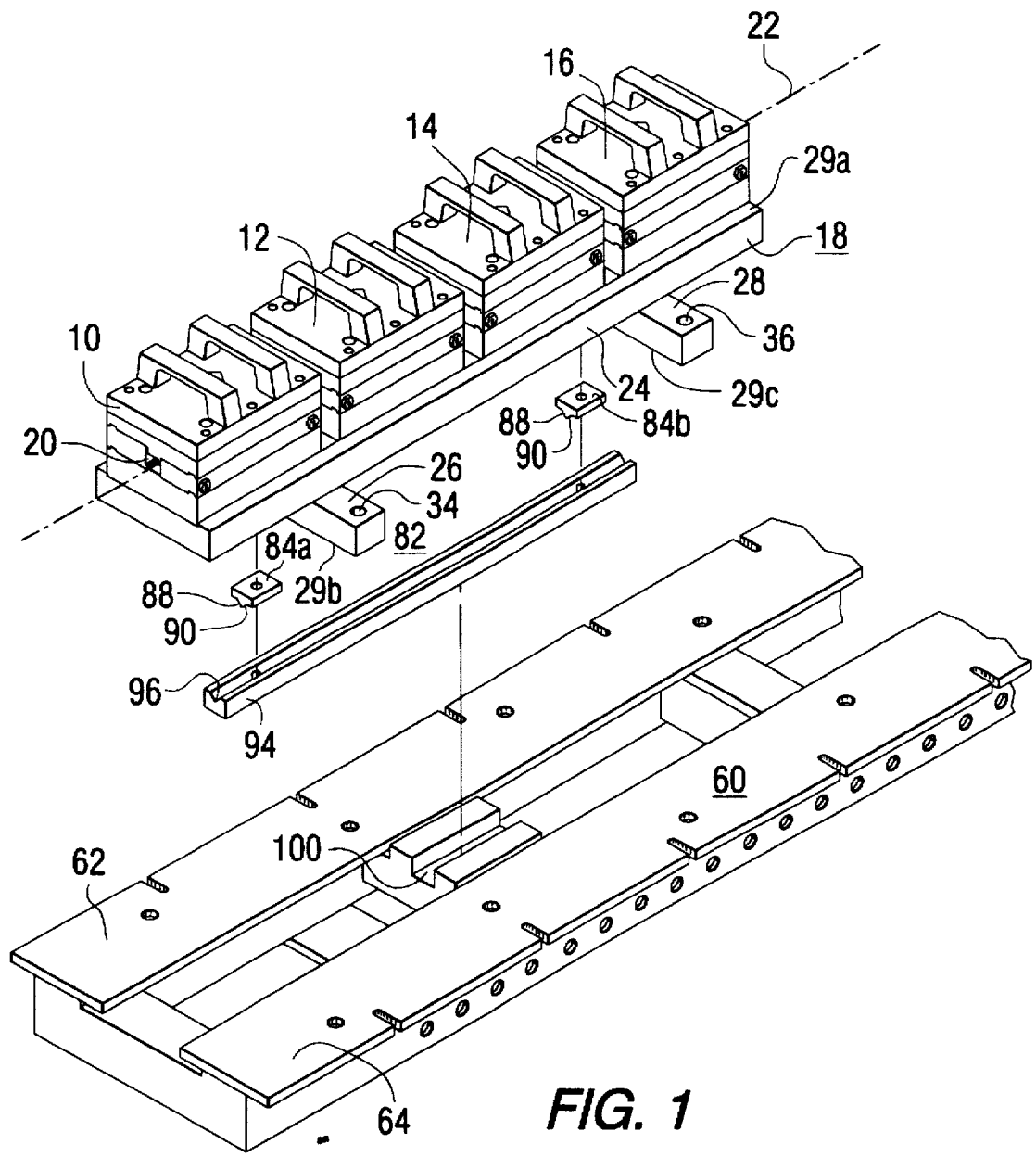
FIG. 1 is an exploded orthogonal view of the disclosed pallet in ration with a base plate and calibration table.
Figure 2:
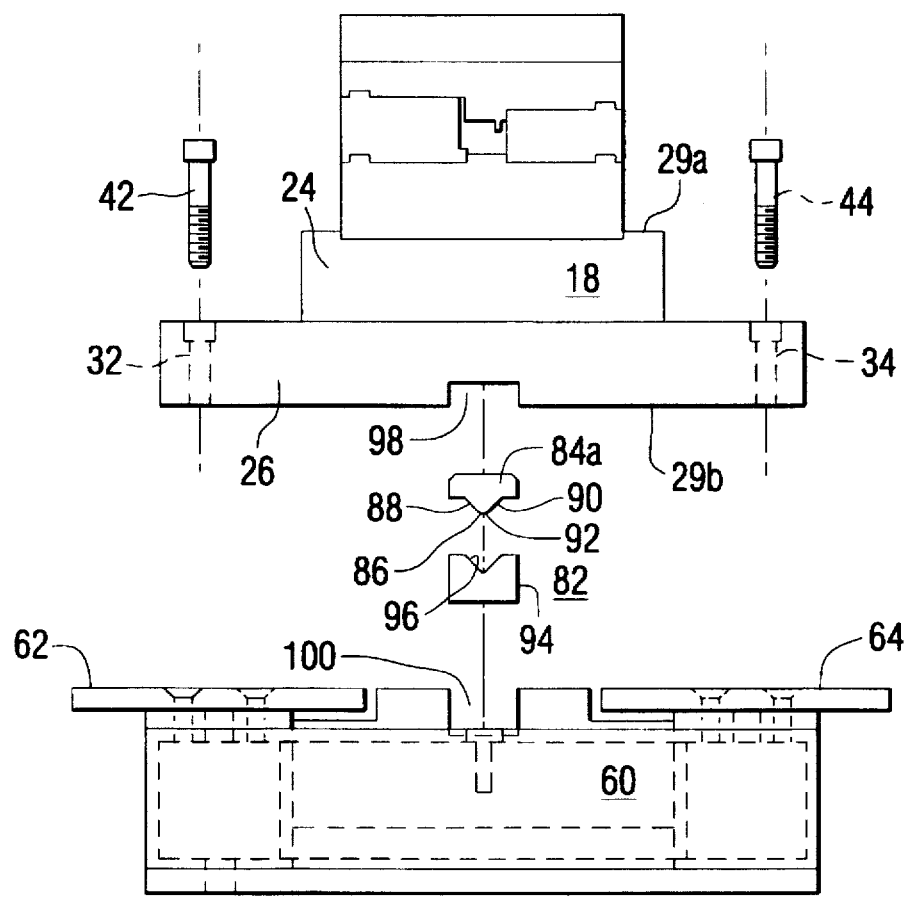
FIG. 2 is an elevation view of the assembly taken along the line II—II of FIG. 1.

As shown in FIGS. 1 and 2, calibrators 10, 12, 14 and 16 are arranged in a linear array and secured to a base 18. As well known in the art, calibrators 10–16 are used in connection with an extruder (not shown) and other equipment (not shown) to extrude thermoplastic material such as vinyl or other material. Calibrators 10–16 are provided with internal manifolds and vacuum ports as well as internal passages for liquid coolants. Vacuum from external pumps (not shown) are connected to the vacuum ports and distributed through the manifolds to control the shape of the plastic extrusion. Coolant supplied to the internal passageways controls the temperature of the calibrator and thereby serves to conduct heat away from the plastic extrusion.

Calibrators 10–16 include a central passageway 20 the surfaces of which serve to define the profile of the extruded material. Accordingly, calibrators 10–16 are unique to a particular extrusion profile. When it is desired to produce an extrusion having a different profile, calibrators 10–16 must be changed over to different calibrators having a passageway that defines the appropriate profile.

The calibrator passageways control the extruded profiles within critical tolerances. Therefore, the calibrators must be precisely aligned with respect to a common axis 22 such that passageways 20 of calibrators 10–16 collectively define a linear extrusion pathway that limits damage to surface finishes, internal strains and other unwanted results. During this changeover period, the extrusion line is non-productive. The invention disclosed herein substantially reduces the time required for changeovers because the time consuming aspect of alignment is done off-line with no loss of production. At times of changeover, the pre-aligned calibrators are quickly and easily installed.

Calibrators 10–16 are mounted on base 18 in a pre-alignment step before the calibrators are installed on the extrusion line. During pre-alignment, calibrators 10–16 are secured to base 18 by bolts or other fixed means. More particularly, base 18 includes base plate 24 and legs 26 and 28. Legs 26 and 28 are secured to base plate 24 by screws or other fixed means. Base 18 includes surface 29a of base plate 24 and surfaces 29b and 29c of legs 26 and 28 respectively. As shown in the drawings, surface 29a is oppositely disposed on base 18 from surfaces 29b and 29c. Calibrators 10–16 are secured to surface 29a of base plate 24. Calibrators 10–16 are aligned on base 18 in accordance with conventional procedures familiar to those skilled in the art such that given points on the profile surfaces of the respective calibrators define an axis 22. In this way, passageways 20 are substantially aligned along axis 22.

To install calibrators 10–16 on table 60 of the extrusion system, base 18 is placed on table 60. In the example of the preferred embodiment, legs 26 and 28 of base 18 are provided with bore holes 32, 34 and 36. Table 60 includes support surfaces 62 and 64 although other configurations of table 60 could also be used. Legs 26 and 28 of base 18 are secured to table 60 by fastening means such as bolts 42 and 44 that are threadingly engaged with table 60. Bore holes 32, 34 and 36 are oversized with respect to bolts 42 and 44 such that base 18 can move with respect to table 60 in response to temperature variation of base 18 and table 60.

As also shown in FIGS. 1 and 2, base 18 is positioned laterally on table 60 by guide 82. Guide 82 includes at least one first member 84a, 84b having an extended portion 86 that is defined between converging surfaces 88 and 90. Preferably, extended portions 86 have an apical end 92 that is radiused.

Guide 82 further includes a second member 94 that cooperates in engaging relationship with first member 84a, 84b. As shown in FIGS. 1 and 2, second member 94 includes a V-shaped linear groove 96 that is sized to receive extended portion 86 of first member 84a, 84b. In the preferred embodiment, first members 84a and 84b are located in respective recessed areas 98 of legs 26 and 28 and secured to legs 26 and 28. Second member 94 is located in a rectangular slot 100 in table 60 and connected to table 60. However, it is within the scope of the disclosed invention that the respective position of members 84a, 84b and 94 could be interchanged. Also, guide 82 could include more than one set of first and second members 84a, 84b and 94 where such members are aligned with a longitudinal axis that is parallel to axis 22 and located on base 18 and table 60 at positions along such longitudinal axis.

As base 18 is lowered onto table 60, extended portion 86 of first member 84a, 84b engages the V-shaped groove 96 of second member 94. The sides 88 and 90 cooperate with the sides of V-shaped groove 96 to laterally guide legs 26 and 28 onto table 60. Due to the shape of extended portion 86 and V-shaped groove 96, the first and second members 84a, 84b and 94 are in substantially sliding engagement with respect to movement in the direction of axis 22. Thus, first and second members 84a, 84b and 94 are in substantially sliding engagement in a direction substantially parallel to axis 22, but oppose movement in directions substantially orthogonal to axis 22. In this way, base 18 is allowed to expand in the longitudinal direction in response to temperature variation, but is maintained within relatively close tolerances in the orthogonal direction so that calibrators 10–16 remain substantially aligned with respect to axis 22.

Typically, base 18 is made of aluminum and table 60 is made of steel. Also typically, base 18 is several meters long. Due to the substantial difference between the coefficient of thermal expansion of steel and the coefficient of thermal expansion of aluminum, a change of temperature of those components will cause the aluminum to vary greater in the longitudinal dimension than the steel. Alternatively, clamps or other fastening means could also be used. The sliding engagement of guide 82 allows movement between base 18 and table 60 in the longitudinal direction to avoid unnecessary stresses and strains within those components and to avoid lateral displacement of base 18 on table 60 or with respect to axis 22.

As will be apparent to those skilled in the art, other embodiments of the invention disclosed herein may be included within the scope of the following claims.

We claim:

1. Apparatus for installing a plurality of calibrators on a support table of a thermoplastic extrusion system, each of said calibrators having an internal passageway with surfaces that define a given profile, said calibrators being located in a linear array such that selected points on each profile define an axis, said apparatus comprising:

a base having a selected surface that is connected to each of the calibrators;

a guide that includes first and second sections that cooperate in mating relationship, the first section of said guide being connected to said base on a surface that is oppositely disposed from the selected surface connected to said calibrators, the second section of said guide being connected to the support table, said first and second sections of said guide cooperating in sliding engagement in a direction substantially parallel to the axis defined by the calibrators; and means for clamping said base to said support table.

2. The apparatus of claim 1 wherein the base is comprised of aluminum.

3. Apparatus for aligning a plurality of calibrators in an extrusion system, each of said calibrators defining a given profile, said calibrators being located in a linear array with selected points on the profile of each calibrator cooperating to define a longitudinal axis, said apparatus comprising:

a table;

a guide having first and second members that are slideably engaged, said first member of said guide being connected to said table;

a base having first and second surfaces that are oppositely disposed, said calibrators being in contact with the first surface of said base and said table being in contact with the second surface of said base, said second member of said guide being fastened to the second surface of said base such that said guide is slideable in a direction substantially parallel to the axis defined by the points on the profile of each calibrator; and means for securing said base to said table.

4. The apparatus of claim 3 wherein the first member of said guide slides with respect to the second member of said guide in response to movement of said base with respect to said table in the direction of said axis.

5. A system for shaping thermoplastic materials, said system comprising:

a linear array of calibrators that define a predetermined profile;

a base that is connected to each of the calibrators, said base maintaining the calibrators in linear relationship at given locations along a longitudinal axis;

a table that supports said base;

means for fastening said base to said table;

a guide that is secured to said base and to said table, said guide having a first section with an extending portion, said guide also having a second section with a channel that receives the extending portion of said first section such that said first and second sections of said guide are in sliding engagement in a direction that is substantially parallel to said longitudinal axis, and such that said first and second sections of said guide oppose movement of said base with respect to said table in directions that are substantially orthogonal to said longitudinal axis.

6. The system of claim 5 wherein the extending portion of the first section of said guide is defined by converging surfaces that meet at a tip.

7. The system of claim 6 wherein the channel of the second section of said guide defines a groove having a substantially constant cross-section.

8. The system of claim 7 wherein the tip of the extended portion of said first section is a radiused tip.

9. The system of claim 8 wherein the second section of said guide includes a V-shaped groove.

10. The system of claim 5 wherein said fastening means comprises a bolt and nut combination that secures said base to said table.

* * * * *